L. DI FRANCESCO.
NUT LOCK.
APPLICATION FILED MAY 20, 1915.
1,247,255. Patented Nov. 20, 1917.
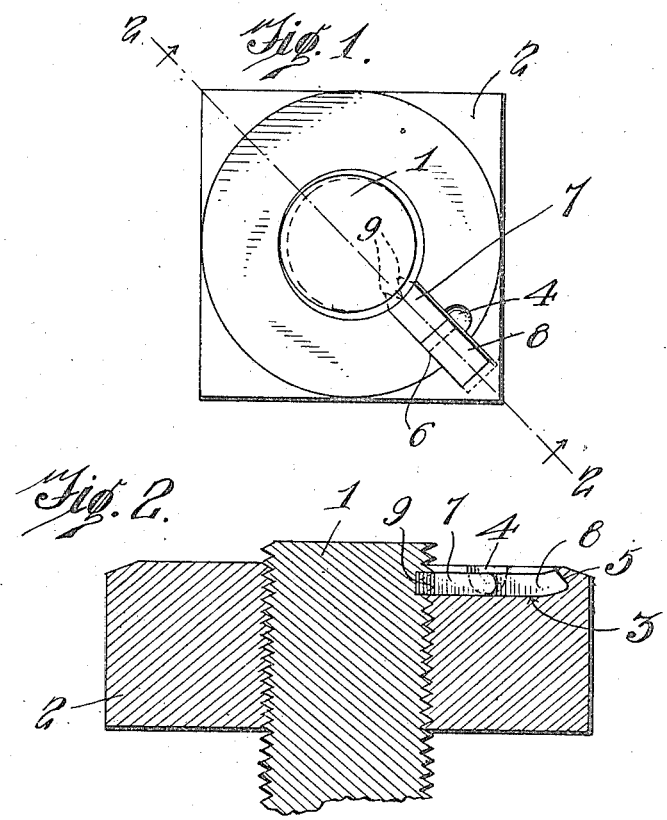
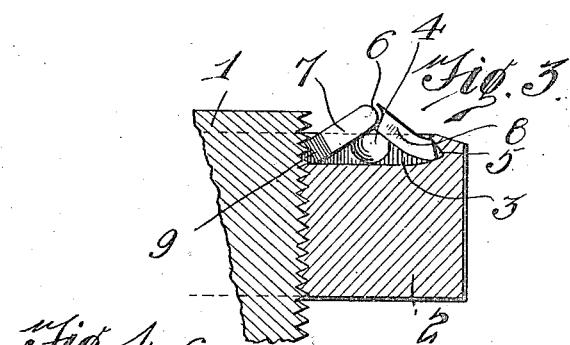
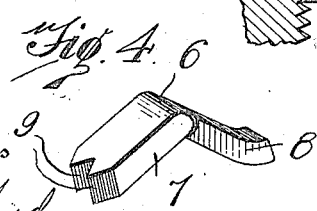
Witnesses
C. P. Hardy
B. F. Garvey Jr.
Inventor
Luigi Di Francesco
By Richard Bowen
Attorney

UNITED STATES PATENT OFFICE.

LUIGI DI FRANCESCO, OF MOUNTVILLE, VIRGINIA.

NUT-LOCK.

1,247,255.      Specification of Letters Patent.      Patented Nov. 20, 1917.

Application filed May 20, 1915. Serial No. 29,440.

*To all whom it may concern:*

Be it known that I, LUIGI DI FRANCESCO, a citizen of the United States, residing at Mountville, in the county of Loudoun and State of Virginia, have invented certain new and useful Improvements in Nut-Locks, of which the following is a specification.

This invention relates to nut locks of that type in which a radial key serves as the locking medium.

An object of the invention is to provide a locking means, which is effectual for positively preventing accidental displacement of the nut from the bolt, nevertheless will not detract from the appearance of the nut, or in any way weaken the latter.

Another object is to provide a positive locking means, yet, one which may be readily disengaged, when it is desired to remove the nut from the bolt.

Other objects as well as the nature, characteristic features and scope of my invention will be more readily understood from the following description taken in connection with the accompanying drawings and pointed out in the claims forming a part of this specification.

Referring to the drawings:

Figure 1 is a top plan view of a nut and bolt embodying my invention,

Fig. 2 is a sectional view of the same on line 2—2, a portion of the bolt being broken away, Fig. 3 is a fragmentary sectional view of a nut and bolt embodying my invention, the locking means being shown in an inoperative position, and Fig. 4 is a detail enlarged perspective view of the locking key used in the present instance.

In the drawings a bolt 1 is provided which is provided with the usual threaded shank and is of the usual or any desired configuration. A nut 2 is mounted on the bolt and is provided in its outer face with a recess 3, the latter having a portion of one of its walls removed to provide an arcuate groove 4. As shown to advantage in Figs. 2 and 3, the recess 3 is inclined toward the outer periphery of the nut and the outer wall 5 of the recess inclined toward the bolt so as to preclude possibility of the locking key being accidentally displaced from the nut.

Mounted in the recess 3 is my improved locking key 6, the latter embodying a two-part structure, as indicated at 7 and 8. The section 7 of the locking key has one of its terminals formed to provide a pair of teeth 9, while the opposite terminal is of an arcuate contour and movably mounted in the concaved inner end of the locking section 8. The outer end of the locking section 8 is turned slightly upwardly so as to conform to the configuration of the recess 3, whereby the key is snugly engaged with the nut at the base of the recess 3, when said nut is in an operative position.

In operation, therefore assuming that the nut has been threaded on the bolt to the desired point, the locking key 6 is first placed in the recess 3 and contorted in the position shown to advantage in Fig. 3 of the drawings. Pressure is then exerted on the key at the jointure of the sections 7 and 8, through the instrumentality of a hammer or other means, thereby forcing the teeth 9 of the section 7 into biting engagement with the threads of the bolt 1 and forcing the outer terminal of the section 8 into engagement with the inclined outer wall 5 of the recess 3, as illustrated to advantage in Fig. 2. In this position, it will be noted that movement of the nut on the bolt in either direction is positively precluded, although the locking key may be readily removed if so desired, by the insertion of an instrument through the groove 4 and into the recess 3, beneath the locking key 6, so as to raise the same. It will furthermore be observed that the groove 4 is arranged so as to lie at the jointure of the sections 7 and 8 thereby causing pressure to be exerted upon the key 6 at the point of least resistance. By inclining the recess 3 toward the outer surface of the nut 2, the stress will be on a line substantially parallel with the longitudinal axis of the section 7 of the key. Moreover, the recess 3 is of a lateral range slightly larger than the lateral measurement of the key 6, so that the latter will find a bearing against the wall of the recess 3 opposite that in which the groove 4 is formed, so as to provide a maximum space in order to facilitate disengagement of the key 6 from the recess 3, when it is desired to remove the nut from the bolt.

It will be understood that the above description and accompanying drawings comprehend only the general and preferred embodiment of the invention and that various minor changes in details of construction, proportion and arrangement of parts may be made within the scope of the appended claims without sacrificing any of the advantages of my invention.

Having thus fully described my invention, what I claim as new and desire to secure by Letters Patent is:

1. A nut lock including a nut having a key seat therein communicating with the bore of the nut, a thread mutilating key detachably mounted in the seat and being separable at a point intermediate its ends to facilitate removal of the key.

2. A nut lock including a nut having a key seat, one end of which is in communication with the bore of the nut, the opposite end of the seat curving upwardly and having its terminal wall inclined, a thread mutilating key detachably mounted in said seat, and severed intermediate its ends to facilitate engagement or removal of the key, one terminal of the latter being inclined to correspond with the inclined terminal wall of the key seat, for preventing casual displacement of the key.

In testimony whereof I affix my signature in presence of two witnesses.

LUIGI DI FRANCESCO.

Witnesses:
GEORGE T. HURDLEY,
JOHN J. CARTY.

Copies of this patent may be obtained for five cents each, by addressing the "Commissioner of Patents, Washington, D. C."